United States Patent
Falk et al.

(10) Patent No.: US 11,314,108 B2
(45) Date of Patent: Apr. 26, 2022

(54) RECONFIGURABLE METASURFACE WITH TUNABLE ANTENNAS FORMED FROM ARRAYS OF PIXELS OF AN OPTICALLY TUNABLE MATERIAL

(71) Applicant: International Business Machines Corporation, Armonk, NY (US)

(72) Inventors: Abram L. Falk, Port Chester, NY (US); Jessie Carrigan Rosenberg, Mount Vernon, NY (US); Kafai Lai, Poughkeepsie, NY (US); Damon Brooks Farmer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 16/541,860

(22) Filed: Aug. 15, 2019

(65) Prior Publication Data
US 2021/0048693 A1  Feb. 18, 2021

(51) Int. Cl.
*H01Q 9/04* (2006.01)
*G02F 1/01* (2006.01)
(Continued)

(52) U.S. Cl.
CPC ............ *G02F 1/0147* (2013.01); *H01Q 3/01* (2013.01); *H01Q 3/30* (2013.01); *H01Q 3/44* (2013.01);
(Continued)

(58) Field of Classification Search
CPC ............... G02F 1/0147; G02F 2203/50; G02F 2202/30; H01Q 3/01; H01Q 3/44; H01Q 3/30; H01Q 9/0442
See application file for complete search history.

(56) References Cited

U.S. PATENT DOCUMENTS 9,379,449 B2  6/2016  Cetiner et al.
9,647,331 B2  5/2017  Manry, Jr. et al.
(Continued)

OTHER PUBLICATIONS

B. Gerislioglu et al., "VO_2-Based Reconfigurable Antenna Platform with Addressable Microheater Matrix," Advanced Electronic Materials, Sep. 2017, 1700170, 8 pages, vol. 3, No. 9.

*Primary Examiner* — Awat M Salih
(74) *Attorney, Agent, or Firm* — Stosch Sabo; Ryan, Mason & Lewis, LLP

(57) ABSTRACT

An apparatus includes two or more tunable antennas providing a reconfigurable metasurface, each of the tunable antennas including a plurality of pixels of optically tunable material, and a control circuit including switches providing current sources and a ground voltage, the switches being coupled to respective ones of the pixels of optically tunable material in each of the tunable antennas via first electrodes, the ground voltage being coupled to respective ones of the pixels of optically tunable material in each of the tunable antennas via second electrodes. The control circuit is configured to modify states of respective ones of the plurality of pixels of optically tunable material in the tunable antennas utilizing current supplied between the first electrodes and the second electrodes to adjust reflectivity of the plurality of pixels of optically tunable material in each of the tunable antennas to dynamically reconfigure respective antenna shape configurations of the tunable antennas.

20 Claims, 7 Drawing Sheets

(51) Int. Cl.
*H01Q 3/44* (2006.01)
*H01Q 3/30* (2006.01)
*H01Q 3/01* (2006.01)

(52) U.S. Cl.
CPC ....... *H01Q 9/0442* (2013.01); *G02F 2202/30* (2013.01); *G02F 2203/50* (2013.01)

(56) References Cited

U.S. PATENT DOCUMENTS

| | | |
|---|---|---|
| 9,923,267 B1 | 3/2018 | Pala et al. |
| 2015/0236408 A1 | 8/2015 | Kona et al. |
| 2016/0013549 A1 | 1/2016 | Schaffner et al. |
| 2016/0218425 A1 | 7/2016 | Mohamadi |
| 2018/0102593 A1 | 4/2018 | Gong et al. |
| 2018/0351092 A1 | 12/2018 | Giessen et al. |
| 2019/0018299 A1* | 1/2019 | Park ............ G02F 1/29 |
| 2019/0064551 A1 | 2/2019 | Gooth et al. |
| 2019/0285798 A1* | 9/2019 | Akselrod ............ G02B 6/1226 |

\* cited by examiner

500

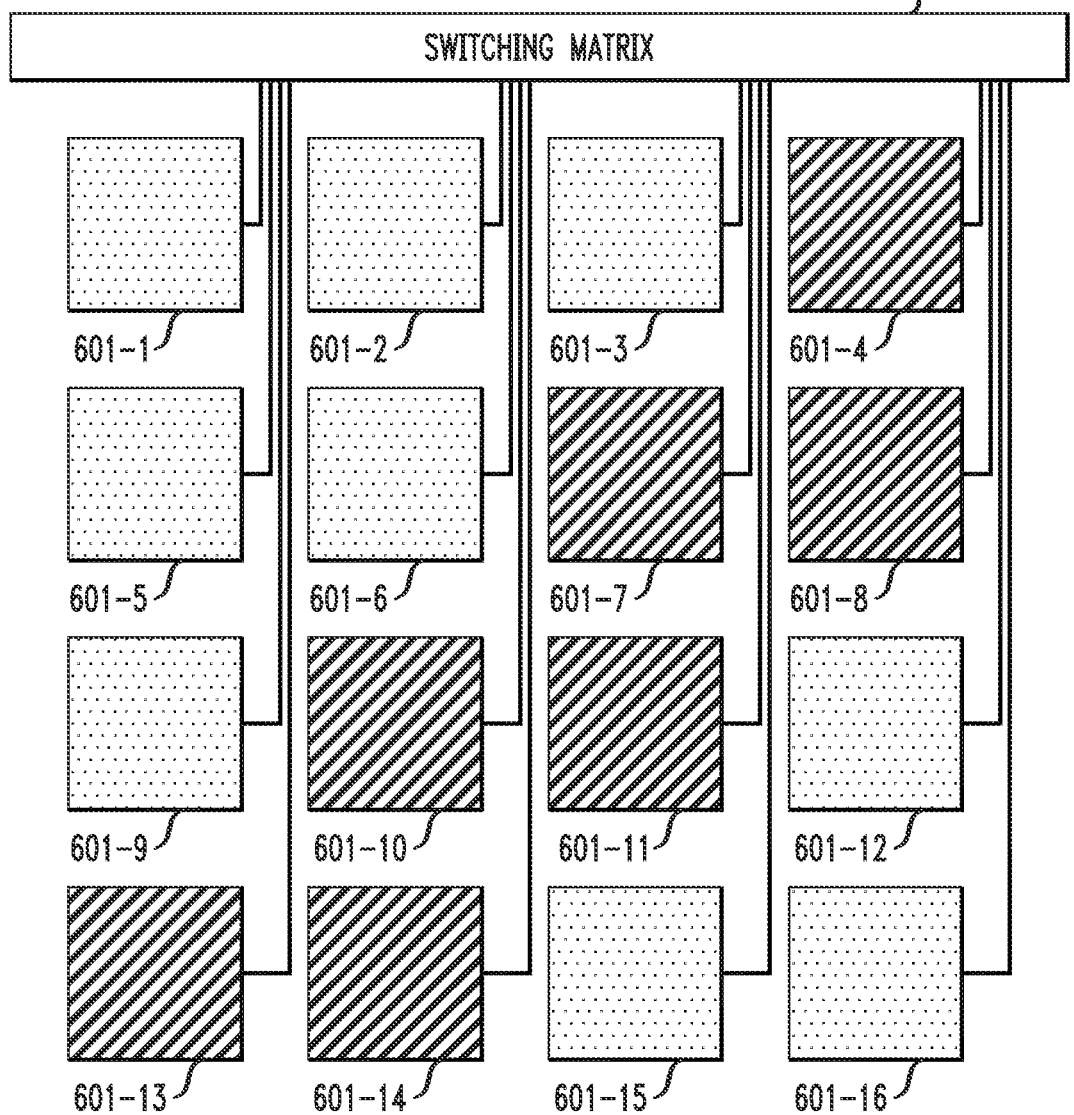

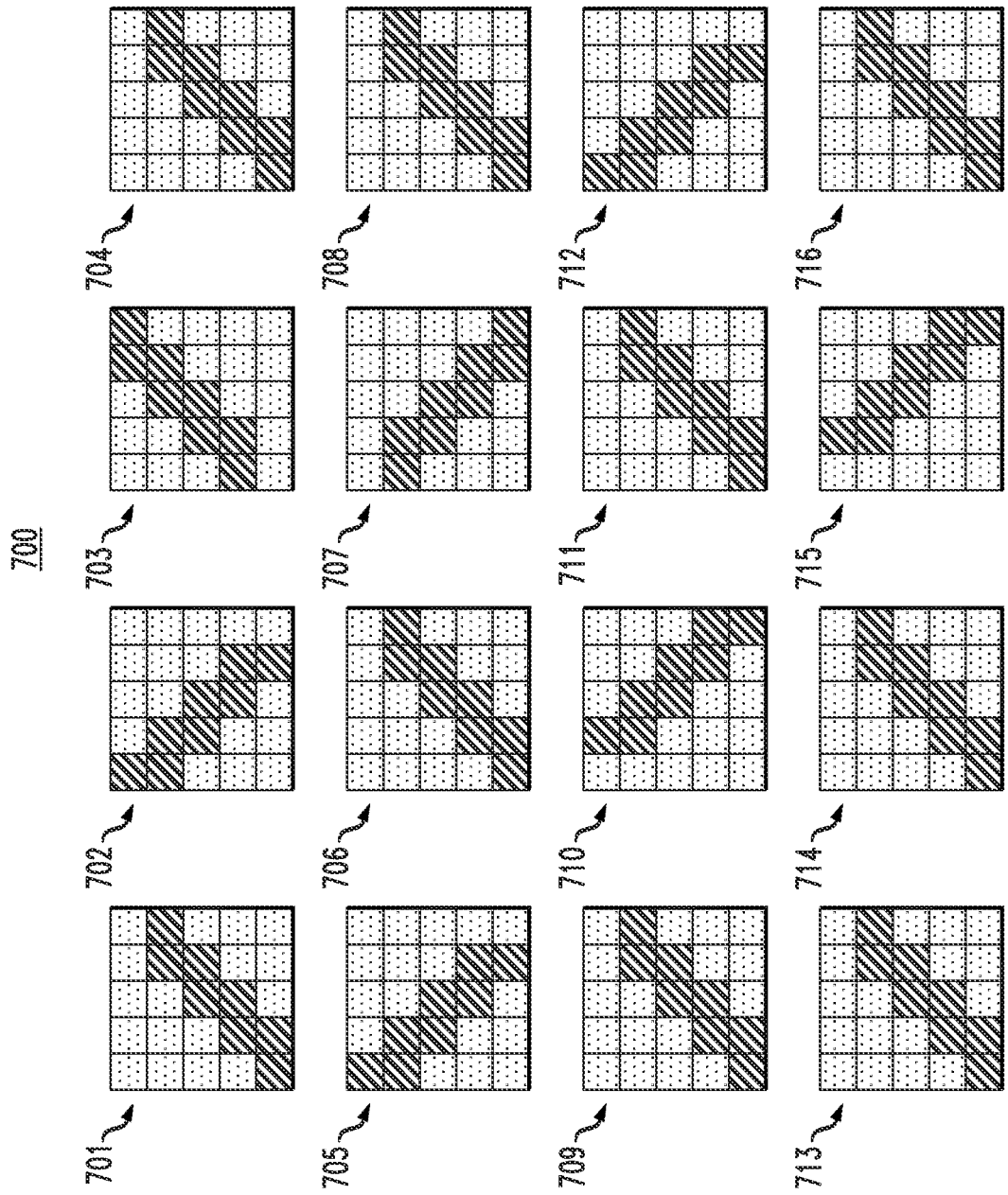

RECONFIGURABLE METASURFACE WITH TUNABLE ANTENNAS FORMED FROM ARRAYS OF PIXELS OF AN OPTICALLY TUNABLE MATERIAL

BACKGROUND

The present application relates to optics, and more specifically, to techniques for forming metasurfaces. A metasurface includes a two-dimensional array of optical antennas or elements used to direct light. A geometric metasurface is a type of metasurface in which the elements thereof are copies of a single antenna at various rotation angles. Metasurfaces may be used for three-dimensional imaging, holographic displays and various other use cases.

SUMMARY

Embodiments of the invention provide techniques for forming arrays of pixels of an optically tunable material, each array providing a tunable antenna for a reconfigurable metasurface.

In one embodiment, an apparatus comprises two or more tunable antennas providing a reconfigurable metasurface, each of the two or more tunable antennas comprising a plurality of pixels of optically tunable material, and a control circuit comprising a plurality of switches providing current sources and a ground voltage, the plurality of switches being coupled to respective ones of the plurality of pixels of optically tunable material in each of the two or more tunable antennas via one of a plurality of first electrodes, the ground voltage being coupled to respective ones of the plurality of pixels of optically tunable material in each of the two or more tunable antennas via one of a plurality of second electrodes. The control circuit is configured to modify states of respective ones of the plurality of pixels of optically tunable material in the two or more tunable antennas utilizing current supplied between the first electrodes and the second electrodes to adjust reflectivity of the plurality of pixels of optically tunable material in each of the two or more tunable antennas to dynamically reconfigure respective antenna shape configurations of each of the two or more tunable antennas.

In another embodiment, a semiconductor structure comprises a substrate, a plurality of pixels of optically tunable material disposed over the substrate, a plurality of first electrodes coupled to respective ones of the plurality of pixels of optically tunable material and to a plurality of switches providing current sources, and a plurality of second electrodes coupled to respective ones of the plurality of pixels of optically tunable material and to a ground voltage. Current supplied between the first electrodes and the second electrodes is configured to modify states of the plurality of pixels of optically tunable material to adjust a reflectivity of the plurality of pixels of optically tunable material to dynamically reconfigure an antenna shape of a tunable antenna comprising the plurality of pixels of optically tunable material.

In another embodiment, a method comprises determining a desired interference effect for a reconfigurable metasurface comprising two or more tunable antennas, each of the two or more tunable antennas comprising a plurality of pixels of optically tunable material, the plurality of pixels of optically tunable material being coupled via respective ones of a plurality of first electrodes to respective ones of a plurality of switches providing current sources and via respective ones of a plurality of second electrodes to a ground voltage. The method also comprises utilizing a control circuit to adjust reflectivity of the plurality of pixels of optically tunable material by modifying states of the plurality of pixels of optically tunable material in each of the two or more tunable antennas to dynamically reconfigure respective antenna shape configurations of each of the two or more tunable antennas to provide the desired interference effect.

BRIEF DESCRIPTION OF THE DRAWINGS

FIG. 6 depicts a top-down view of wiring of an array of pixels providing a tunable antenna for a reconfigurable metasurface, according to an embodiment of the invention.

FIG. 7 depicts a top down view of a plurality of arrays of pixels providing multiple tunable antennas for a reconfigurable metasurface, according to an embodiment of the invention.

DETAILED DESCRIPTION

Figure 1:
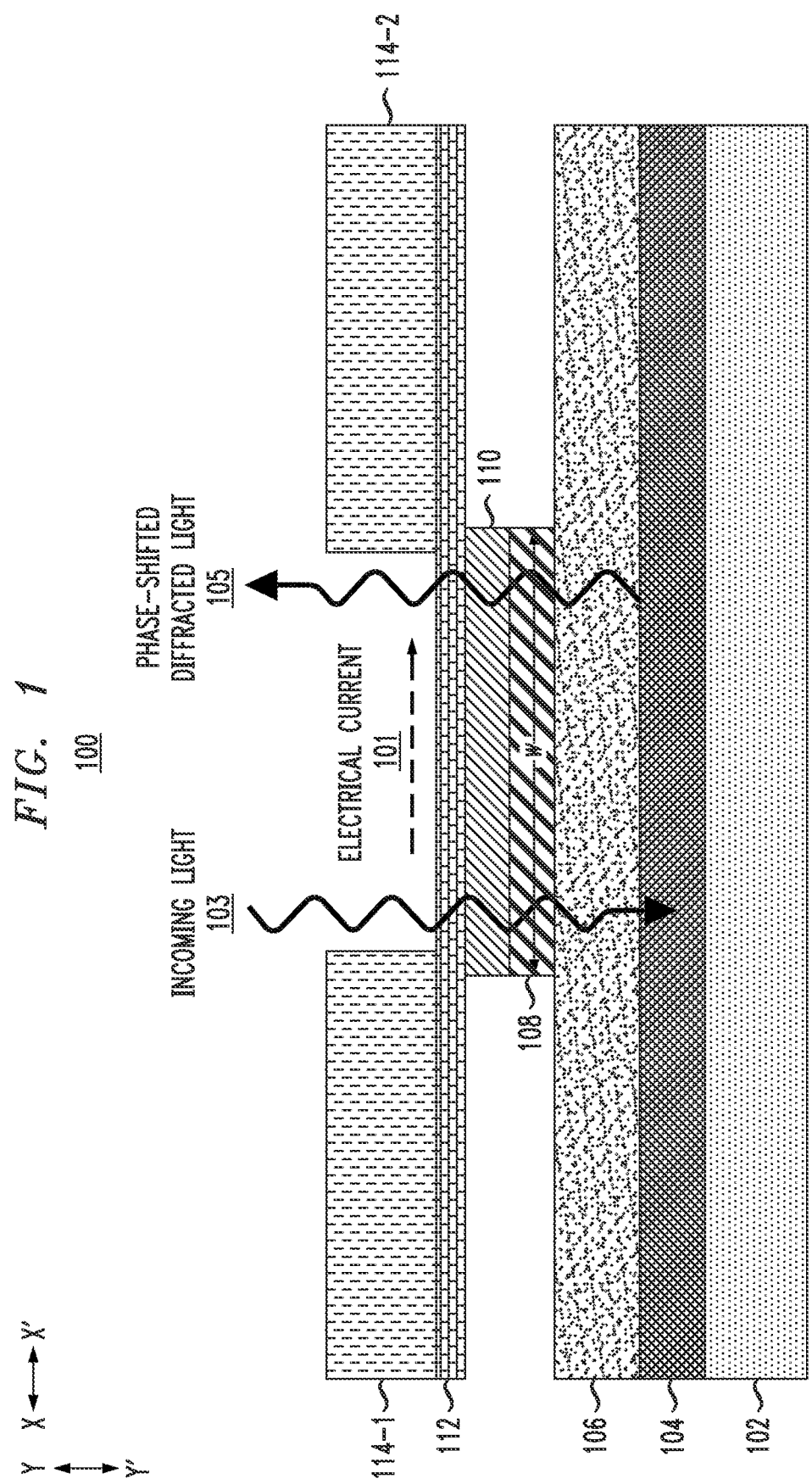
FIG. 1 depicts a side cross-sectional view of a pixel providing a portion of a tunable antenna of a reconfigurable metasurface, according to an embodiment of the invention.

Illustrative embodiments of the invention may be described herein in the context of illustrative methods for forming arrays of pixels of an optically tunable material, the arrays providing tunable antennas for a reconfigurable metasurface. However, it is to be understood that embodiments of the invention are not limited to the illustrative methods, apparatus, systems and devices but instead are more broadly applicable to other suitable methods, apparatus, systems and devices.

Metasurfaces are two-dimensional arrays of microwave, infrared or optical antennas. When light is incident on a metasurface, each antenna provides a unique intentional delay to the light that is incident on it before radiating it. Each antenna may also absorb some of the light that is incident on it before radiating it. Thus, when a light beam is reflected or transmitted by a metasurface, it has a two-dimensionally varying phase and/or amplitude imprinted on it by the metasurface. Through optical interference and diffraction, this spatially varying phase and/or amplitude response then allows the metasurface to direct light fields into complex patterns. A geometric metasurface is a metasurface in which the elements of the metasurface are copies of a single antenna at various rotation angles. A "reflection-type" metasurface diffracts light in the hemisphere containing the light source, bounded by the metasurface. A "transmission-type" metasurface diffracts light in the other hemisphere (e.g., the hemisphere that does not contain the light source, bounded by the metasurface).

Technologically, metasurfaces enable a wide variety of optical elements to be fabricated in a planar, subwavelengththick chip or circuit. Examples of such optical elements include but are not limited to planar lenses, waveplates, filters, and polarizers. More sophisticated diffractive optical elements and devices, such as computer-generated holograms (CGHs), can also be generated by metasurfaces. For CGHs, a laser or light beam incident on the metasurface can be controllably reflected or transmitted to produce a three-dimensional (3D) image, without the need for specialized 3D glasses. Diffractive optical elements and devices may also be used in 3D imaging applications, solid-state Light Detection and Ranging (LIDAR) applications, etc.

Developments in nano-photonics have allowed analogs of several advanced radio-frequency and microwave technologies to be scaled down to the visible and infrared regimes. In particular, infrared and visible-frequency metasurfaces, which are two-dimensional arrays of antennas, derive from phased microwave arrays. Such structures have demonstrated their capability as playing the role of a variety of optical elements.

Various types of antennas may be useful in metasurfaces, including rectangular patch antennas, Babinet "V" antennas, slot antennas, etc. An important challenge in metasurfaces is finding ways to tune these more complicated antennas. Thus, there exists a need for "dynamic" (e.g., tunable or reconfigurable) metasurfaces for these and other applications.

Phase-change materials and other types of optically tunable materials may be capable of having their resonant frequency tuned (e.g., by tuning the material). However, this type of tuning typically just perturbs the resonance of the antenna not significantly altering its shape. A particular type of shape-changing of antennas that would be useful is the ability to dynamically rotate an antenna about its center point. This capability would enable formation of a dynamically tunable geometric metasurface that can direct light with high fidelity.

Antennas of a metasurface may be metallic or dielectric. Metal antennas can take advantage of plasmonic effects and be especially small (e.g., on the range of 5 to 200 nm), whereas dielectric antennas form photonic cavities that typically have lower loss. One particularly effective technique is to have antennas fabricated on top of a dielectric-mirror stack. In some cases, a low quality factor out-of-plane Fabry-Perot resonance across the dielectric is set up, which can enhance the effect of the antennas.

In a geometric metasurface, circularly polarized light is incident on the metasurface and the antennas radiate light whose circular polarization is reversed from that of a flat surface. Geometric metasurfaces can be transmissive metasurfaces or reflective metasurfaces. If right-handed circularly polarized (RCP) light is incident on the geometric metasurface, the reflected light from a reflective metasurface would also be RCP, and the transmitted light from a transmissive metasurface would be left-handed circularly polarized (LCP).

Although each antenna in a geometric metasurface reverses the circular polarization of light, if the antennas are fabricated such that the shape of each antenna is identical but the in-plane rotation angle (denoted $\varphi$) of each antenna is different, then the transmitted or reflected light from neighboring antennas will display an interference effect that causes the light to diffract non-orthogonally to the plane of the metasurface.

This interference effect is based on the geometric phase, otherwise known as the Pancharatnam-Berry phase, of the light radiated by the antennas. The geometric phase of light may be visualized on a Poincare sphere. In the Poincare sphere, RCP light is at the north pole, LCP light is at the south pole, and linearly polarized light is at the equator. The geometric phase (denoted $\varphi_{geom}$) of light radiating from each antenna has a direct relationship to the in-plane antenna rotation angle ($\varphi_{geom}=2\varphi$). Thus, $\varphi_{geom}$ can be readily spatially controlled across the metasurface.

Compared to conventional phase metasurfaces, which comprise a 2D array of antennas whose shape is spatially varied across the array, geometric phase metasurfaces in which the shape is held constant while the orientation is varied have several advantages. For example, geometric phase metasurfaces typically have higher diffraction efficiencies (e.g., the fraction of incident light that is diffracted into the desired optical mode) than ordinary metasurfaces. Geometric phase metasurfaces are also immune to design and fabrication errors. The geometric phase, which is set by the geometric rotation angle of the antenna, can be designed with greater precision than conventional phase metasurfaces. Geometric phase metasurfaces can also be readily designed to be broadband (e.g., to work at a broad span of optical wavelengths).

A need exists, however, for a design of dynamically tunable geometric metasurfaces. One of the key challenges facing the production of tunable geometric metasurfaces is that it is typically difficult to change an antenna's orientation. Illustrative embodiments provide dynamically tunable geometric metasurfaces enabling change in the orientation of antennas.

In some embodiments, a structure is provided that functions as a tunable geometric metasurface. The structure is based on a super-array of antennas that comprises several interpenetrating sub-arrays of antennas. Each sub-array is itself an array of pixels that may be individually tuned to achieve a desired shape (e.g., rotation) of an antenna provided by that array of pixels.

In some embodiments, a reconfigurable metasurface comprises two or more antennas, with each antenna being formed from a two-dimensional grid of "pixels" that can each be individually tuned. Thus, each antenna may be tuned to create, change and erase shapes dynamically. Various types of optically tunable materials may be used to form each of the pixels in an array providing a tunable antenna. In some embodiments, the optically tunable material comprises a thin film of phase-change material (PCM). The PCM may be an amorphous-to-crystalline PCM such as a chalcogenide PCM. Chalcogenide PCMs include, but are not limited to, germanium antimony telluride ($Ge_xSb_yTe_z$), germanium telluride ($Ge_xTe_y$), antimony telluride ($Sb_xTe_y$), silver antimony telluride ($Ag_xSb_yTe_z$), silver indium antimony telluride ($Ag_wIn_xSb_yTe_z$), etc. In some embodiments, $Ge_2Sb_2Te_5$ is used for the PCM. In other embodiments, $Ge_3Sb_2Te_2$, GeTe, SbTe, or AgInSbTe may be used.

In these chalcogenide PCMs, the chalcogenide can be thermally switched between a crystalline phase and an amorphous phase. For example, a first current pulse (e.g., short, intense current pulses, such as current pulses with an intensity of 5 volts and a duration of 50 nanoseconds) may be used to Joule-heat an amorphous phase chalcogenide PCM (e.g., $Ge_xSb_yTe_z$) to a temperature of about 300 degrees Celsius (° C.), which causes the amorphous phase chalcogenide PCM to crystallize. A second current pulse (e.g., longer, less intense current pulses, such as current pulses with an intensity of 3 volts and a duration of 1 millisecond) with higher power but slower pulsing may be used to Joule-heat the crystalline phase chalcogenide PCM to a temperature of about 600° C. which causes the crystalline phase chalcogenide PCM to melt-quench into the amorphous phase. In these two different phases, the chalcogenide has different optical properties. Thus, the resonant frequency of the antennas can be switched.

In other embodiments, however, the optically tunable material may comprise an electrically tunable plasmonic material (e.g., graphene, carbon nanotubes, a metal oxide, a metal nitride such as titanium nitride (TiN), etc.), a metal-insulator transition material (e.g., vanadium dioxide ($VO_2$), etc.), an ion-driven electrochromic material such as tungsten oxide ($WO_3$), etc. While various embodiments are described below in the context of using a PCM as the tunable optical material, it should be appreciated that the PCM may be replaced with these alternatives as desired for a particular implementation.

The various pixels in each tunable antenna may be switched to desired states, such that each of the tunable antennas has a desired shape. Light may then be directed at the reconfigurable metasurface, where diffracted light from the metasurface forms a diffracted image whose 3D spatial intensity is a function of the state and shape of each of the tunable, pixelated antennas of the metasurface.

In some embodiments, the antenna-to-antenna pitch of tunable antennas in the reconfigurable metasurface is ideally half the wavelength of the light that is intended to be manipulated by the reconfigurable metasurface. For visible light, this corresponds to an antenna-to-antenna pitch of approximately 300 nm. The number of pixels in a given tunable antenna may vary, such as from 9 (e.g., in a 3×3 grid) to 100 (e.g., in a 10×10 grid). It should be appreciated that a tunable antenna need not comprise a square grid of pixels. In some embodiments, other rectangular grids of pixels may be used. Further, a plurality of pixels may be arranged to approximate a circle or ellipse. In the description below, it is assumed that each pixel is a square with a size denoted as w, where w may be in the range of tens of nanometers (nm).

Figure 2:
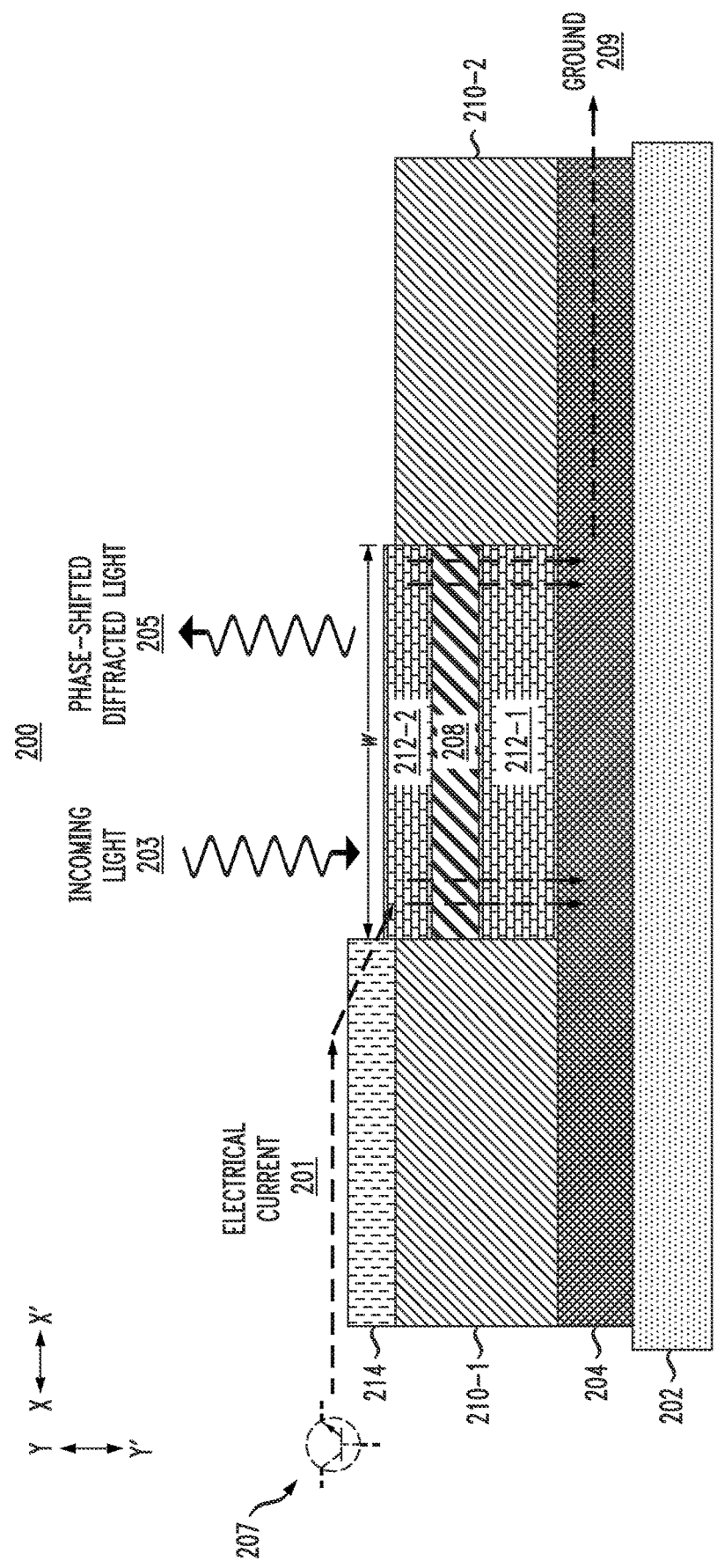
FIG. 2 depicts another side cross-sectional view of a pixel providing a portion of a tunable antenna of a reconfigurable metasurface, according to an embodiment of the invention.
Figure 3:
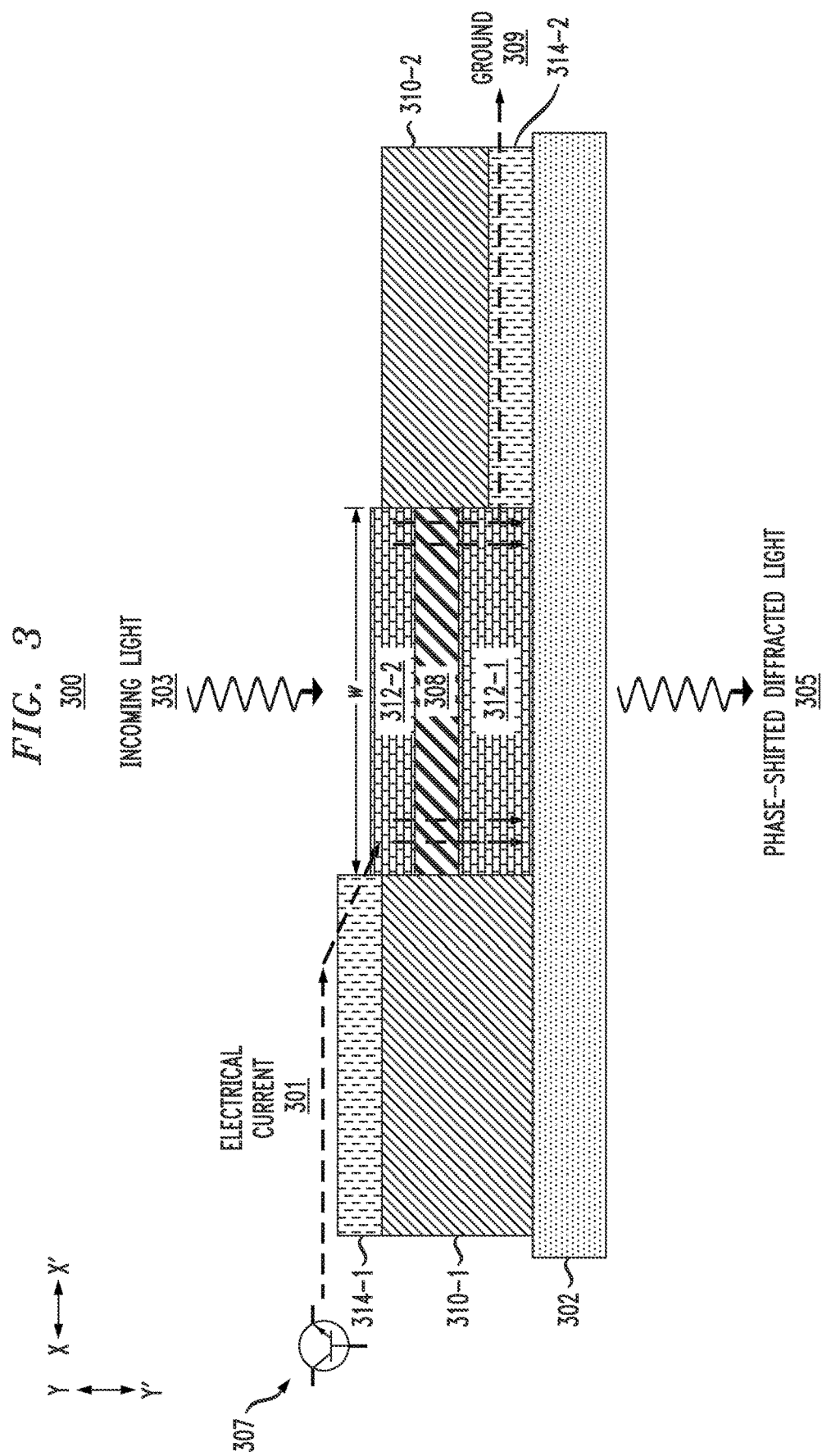
FIG. 3 depicts another side cross-sectional view of a pixel providing a portion of a tunable antenna of a reconfigurable metasurface, according to an embodiment of the invention.

FIGS. 1-3 show side cross-sectional views 100, 200 and 300, respectively, of different implementations for a pixel of a tunable antenna. FIG. 1 shows an example of a pixel, including a substrate 102, mirror 104, dielectric layer 106, PCM 108, dielectric layer 110, transparent conductor layer 112, and electrodes 114-1 and 114-2.

The substrate 102 may be formed of silicon (Si) or another suitable material such as glass, calcium fluoride ($CaF_2$), zinc selenide (ZnSe) or another suitable material. The substrate 102 may have a vertical thickness or height (in direction Y-Y') in the range of 50 micrometers (μm) to 1000 μtm.

The mirror 104 may be a metal mirror formed of aluminum (Al), silver (Ag), gold (Au), platinum (Pt), titanium nitride (TiN) or another suitable material. The mirror 104 may have a vertical thickness or height (in direction Y-Y') in the range of 50 nm to 500 nm.

The dielectric layer 106 may be formed of magnesium fluoride ($MgF_2$), silicon dioxide ($SiO_2$), silicon nitride (SiN), titanium oxide (TiO) or another suitable material. The dielectric layer 106 may have a vertical thickness or height (in direction Y-Y') in the range of 30 nm to 500 nm.

The dielectric layer 110 may be formed of $MgF_2$, $SiO_2$, SiN, TiO or another suitable material. The dielectric layer 110 may have a vertical thickness or height (in direction Y-Y') in the range of 3 nm to 300 nm.

The transparent conductor 112 may be formed of indium tin oxide (ITO) or another suitable material such as TiN, an AZO compound, etc. The transparent conductor 112 may have a vertical thickness or height (in direction Y-Y') in the range of 5 nm to 200 nm.

The electrodes 114-1 and 114-2 (collectively, electrodes 114) may be formed of platinum (Pt) or another suitable refractory material such as TiN, tantalum nitride (TaN), tungsten (W), etc. The electrodes 114 may have a vertical thickness or height (in direction Y-Y') in the range of 50 nm to 500 nm. Each of the electrodes 114 may have a horizontal thickness or width (in direction X-X') in the range of 100 nm to 500 nm.

In the pixel shown in FIG. 1, the substrate 102 and electrodes 114 are used for Joule heating the PCM 108 to switch its phase (e.g., from crystalline to amorphous and vice-versa). Electrical current 101 flows from a switch 107 through the electrode 114-1 to electrode 114-2 connected to ground 109. The electrical current 101 passes through the transparent conductor 112 and dielectric layer 110, heating the PCM 108 to change its phase. Incoming light 103 that is incident on the pixel of FIG. 1 is then reflected as phase-shifted diffracted light 105. The phase-shifted diffracted light 105 has a geometric phase that varies based on the state of the pixel.

FIG. 2 shows another example of a pixel, including a substrate 202, mirror 204, PCM 208 disposed between two transparent conductors 212-1 and 212-2 (collectively, transparent conductors 212), insulator layers 210-1 and 210-2 (collectively, insulator layers 210), and electrode 214. The mirror 204 in the FIG. 2 embodiment functions as an electrode that contacts the bottom transparent conductor 212-1. The top transparent conductor 212-2 contacts the electrode 214 that runs current 201 from switch 207 to ground 209 through the transparent conductors 212-1 and 212-2 and the PCM 208 between. The electrode 214 is electrically protected from the mirror 204 by the insulator layers 210. Similar to the pixel of FIG. 1, incoming light 203 that is incident on the pixel of FIG. 2 is reflected as phase-shifted diffracted light 205, controllably based on the phase of the PCM 208.

The substrate 202, mirror 204, PCM 208 and electrode 214 may be formed of similar materials and with similar sizing as that described above with respect to the substrate 102, mirror 104, PCM 108 and electrodes 114, respectively. The transparent conductors 212 may be formed of similar materials as that described above with respect to the transparent conductor 112. Each of the transparent conductors 212 may have a vertical thickness or height (in direction Y-Y') in the range of 5 nm to 200 nm. The insulator layers 210 may be formed of $MgF_2$, $SiO_2$, SiN, TiO or another suitable material.

FIG. 3 shows another example of a pixel, including a substrate 302, PCM 308 disposed between transparent conductors 312-1 and 312-2 (collectively, transparent conductors 312), electrodes 314-1 and 314-2 (collectively, electrodes 314), and insulator layers 310-1 and 310-2 (collectively, insulator layers 310). The FIG. 3 pixel is similar to that of the FIG. 2 pixel, although the FIG. 3 pixel does not include a bottom mirror and thus incoming light 303 incident on the antenna is transmitted (rather than reflected as in FIG. 2) as phase-shifted diffracted light 305. Electrical current 301 from switch 307 flows through electrode 314-1, the transparent conductors 312 and PCM 308, and to electrode 314-2 to ground 309.

The substrate 302, PCM 308, insulator layers 310 and transparent conductors 312 may be formed of similar materials and with similar sizing as that described above with respect to substrate 102, PCM 108, insulator layers 210 and transparent conductors 212. The electrodes 214 may be formed of similar materials as those described above with respect to the electrodes 114. Each of the electrodes 314 may have a vertical thickness or height (in direction Y-Y') in the range of 50 nm to 500 nm.

In the pixel structures shown in FIGS. 1-3, the PCM is enclosed in a low quality-factor resonator. In the cases of FIGS. 1 and 2, the low quality-factor resonator comprises a back-plane mirror along with dielectric materials on both the top and bottom of the PCM 108/208. In the case of FIG. 3, the back-plane mirror is omitted. These resonator arrangements may be used to enhance the diffraction efficiency of the pixel of optically tunable material (e.g., PCM 108, 208, 308) providing a portion of a tunable antenna. The diffraction efficiency of a metasurface is defined as the fraction of light whose circular polarization is reversed by the antennas. This is also the fraction of light that can participate in the geometrical phase interference, and thus contribute to a desired image.

It should be appreciated that the pixels of FIGS. 1-3 are presented by way of example only, and that embodiments are not limited to these specific configurations of pixels. Various other arrangements may be used, including variations for transmission versus reflection of incident light, different arrangements of electrodes, insulator layers, transparent conductors, etc. Further, as noted above, while the pixels of FIGS. 1-3 are described with respect to using a PCM as the optically tunable material, in other embodiments various other optically tunable materials may be used in place of or in addition to a PCM.

Figure 4:
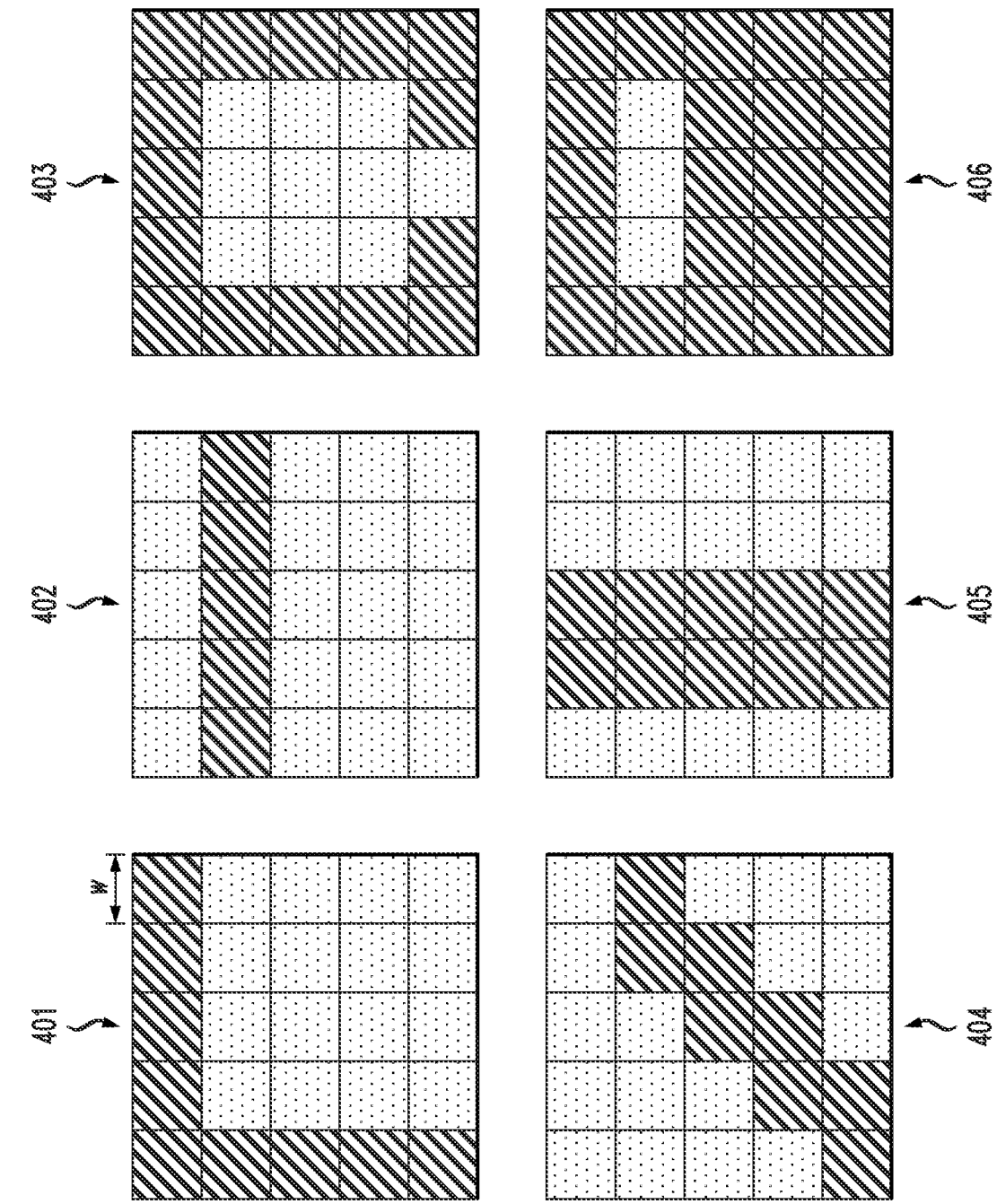
FIG. 4 depicts a top-down view of various configurations of an array of pixels providing a tunable antenna for a reconfigurable metasurface, according to an embodiment of the invention.

FIG. 4 shows a top-down view 400 of a set of six pixelated antennas 401, 402, 403, 404, 405 and 406. Each of the pixelated antennas 401 through 406 comprises 25 pixels (arranged in 5×5 square grids). It is assumed that each of the pixels is formed as described above with respect to one of the structures shown in FIGS. 1-3, and that the optically tunable material used is a PCM such as $Ge_2Sb_2Te_5$ (GST) that is patterned to be amorphous or crystalline (e.g., a-GST and c-GST, respectively). The GST may be surrounded on the top and bottom by transparent electrodes that may be wired to external electrodes for a matrix of switches. The top-down view 400 illustrates the GST layer only.

The pixelated antennas 401 through 406 illustrate different shapes of antennas that may be formed by tuning the pixels as shown. Pixelated antenna 401 shows a Babinet "V" antenna shape configuration, pixelated antenna 402 shows a horizontally oriented rectangular patch antenna shape configuration, pixelated antenna 403 shows a split-ring resonator antenna shape configuration, pixelated antenna 404 shows a diagonal patch antenna shape configuration, pixelated antenna 405 shows a vertically oriented patch antenna shape configuration, and pixelated antenna 406 shows a horizontally oriented slot antenna shape configuration. It should be appreciated, however, that these antenna shape configurations are shown by way of example only, and that other antenna shape configurations may be used in other embodiments.

Figure 5:
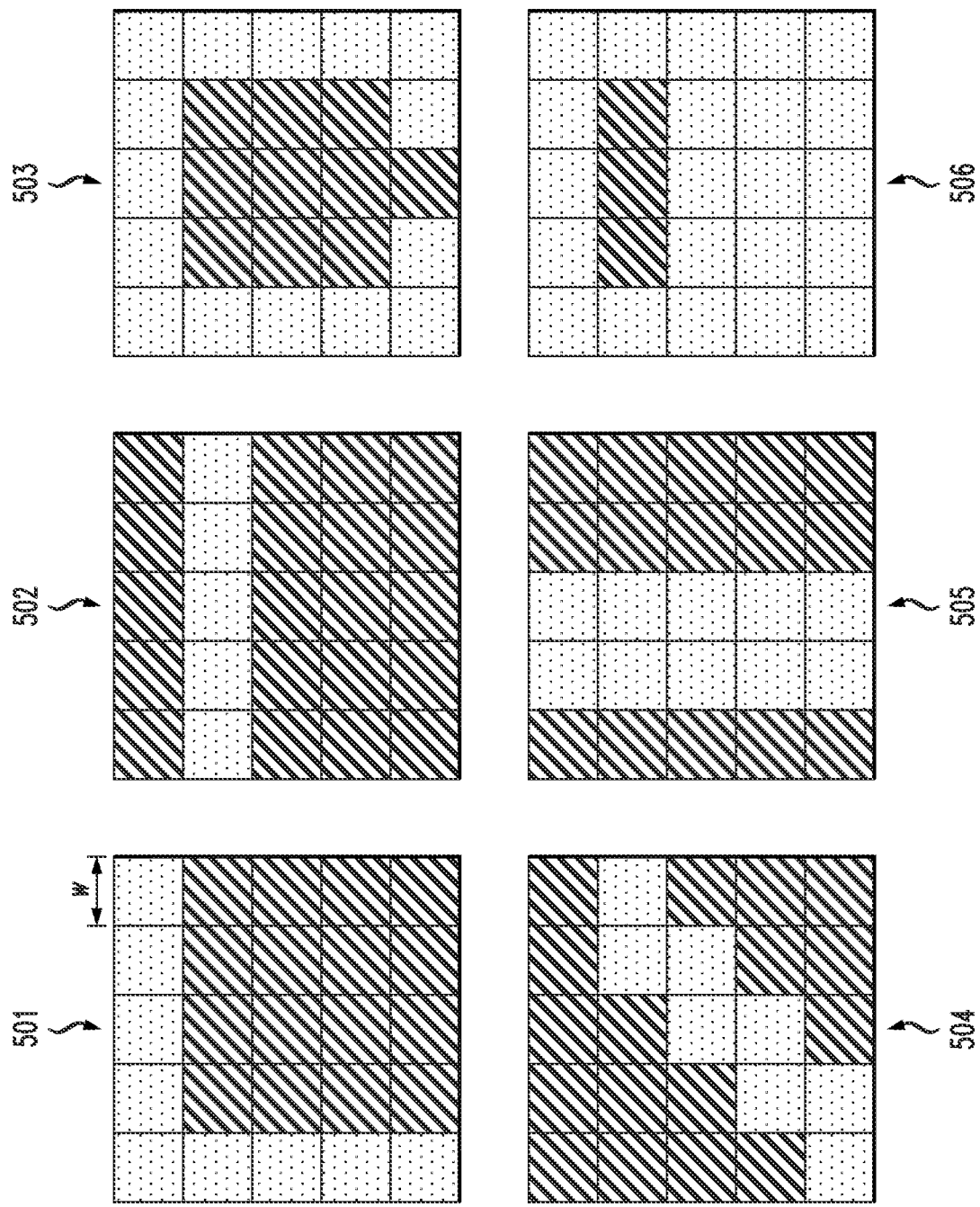
FIG. 5 depicts a top-down view of various configurations of another array of pixels providing a tunable antenna for a reconfigurable metasurface, according to an embodiment of the invention.

In FIG. 4, the c-GST is patterned on top of an a-GST background where the c-GST configured pixels positively define the antenna shape configurations of pixelated antennas 401 through 406. This, however, is not a requirement. Instead, the a-GST configured pixels may positively define the antenna shape configurations as shown for pixelated antennas 501, 502, 503, 504, 505 and 506 in the top-down view 500 of FIG. 5. The pixelated antennas 501 through 506, similar to pixelated antennas 401 through 406, are comprised of 5×5 square grids of GST material, again showing different antenna shape configurations (e.g., Babinet "V", horizontally oriented rectangular patch, split-ring resonator, diagonal patch, vertically oriented patch, and horizontally oriented slot, respectively). The pixelated antennas 501 through 506, however, have a-GST patterned on top of a c-GST background where the a-GST configured pixels positively define the antenna shape configurations.

FIG. 6 shows a top-down view 600 of a wiring schematic for pixels 601-1, 601-2, 601-3, 601-4, 601-5, 601-6, 601-7, 601-8, 601-9, 601-10, 601-11, 601-12, 601-13, 601-14, 601-15 and 601-16 (collectively, pixels 601) of a pixelated tunable antenna. Each of the pixels 601 is wired to a switching matrix 602 that can selectively route current to the pixels 601 (e.g., as described above in conjunction with FIGS. 1-3) to tune the optically tunable material of the pixels 601. The pixels 601 of FIG. 6 are assumed to be formed of GST, and where c-GST tuned pixels 601-4, 601-7, 601-8, 601-10, 601-11, 601-13 and 601-14 positively define the antenna shape configuration (e.g., diagonal patch) relative to background a-GST pixels 601-1, 601-2, 601-3, 601-5, 601-6, 601-9, 601-12, 601-15 and 601-16. The pixels 601 may each have an outside point of a transparent conductor (e.g., on top of each of the pixels) attached to a transistor, with the transistors sourcing current to the different pixels 601 as actuated by switching matrix 602 to switch different ones of the pixels 601 between a-CST and g-CST to collectively produce a desired antenna shape configuration.

FIG. 7 shows a top-down view 700 of a plurality of arrays of pixels providing multiple tunable pixelated antennas 701, 702, 703, 704, 705, 706, 707, 708, 709, 710, 711, 712, 713, 714, 715 and 716. The tunable pixelated antennas 701 through 716 collectively provide a reconfigurable metasurface. Specifically, the tunable pixelated antennas 701 through 716 are each diagonal patch shaped antenna configurations that are related to one another by rotation, thereby forming a geometric metasurface.

While FIGS. 3-7 each illustrate examples where pixelated tunable antennas are formed from square grids of pixels, this is not a requirement as noted above. In other embodiments, a pixelated tunable antenna may include other types of rectangular grids or other desired shapes (e.g., pixels approximating a circle, an ellipse, etc.). Further, although FIGS. 3-7 illustrate embodiments where each pixelated tunable antenna in an array of antennas providing a reconfigurable metasurface has the same number of pixels, this is not a requirement. In other embodiments, different pixelated tunable antennas in the same reconfigurable metasurface may have different numbers of pixels, possibly arranged in different sized square, rectangular or other grid structures. Also, different pixelated tunable antennas (or different pixels within a given pixelated tunable antenna) may utilize different types of optically tunable materials. For example, some pixels within a particular pixelated tunable antenna may use PCM while other pixels within that pixelated tunable antenna may use an electrically tunable plasmonic material, etc. Similarly, different pixelated tunable antennas in the same reconfigurable metasurface may use different optically tunable materials.

In some embodiments, an apparatus comprises two or more tunable antennas providing a reconfigurable metasurface, each of the two or more tunable antennas comprising a plurality of pixels of optically tunable material, and a control circuit comprising a plurality of switches providing current sources and a ground voltage, the plurality of switches being coupled to respective ones of the plurality of pixels of optically tunable material in each of the two or more tunable antennas via one of a plurality of first electrodes, the ground voltage being coupled to respective ones of the plurality of pixels of optically tunable material in each of the two or more tunable antennas via one of a plurality of second electrodes. The control circuit is configured to modify states of respective ones of the plurality of pixels of optically tunable material in the two or more tunable antennas utilizing current supplied between the first electrodes and the second electrodes to adjust reflectivity of the plurality of pixels of optically tunable material in each of the two or more tunable antennas to dynamically reconfigure respective antenna shape configurations of each of the two or more tunable antennas.

The control circuit may be configured to modify the states of respective ones of the plurality of pixels of optically tunable material in a given one of the tunable antennas to dynamically reconfigure a given antenna shape of the given tunable antenna between at least two different antenna shape configurations.

The at least two different antenna shape configurations may comprise two or more different orientations of a given antenna shape configuration. The two or more different orientations of the given antenna shape configuration comprise at least two of a horizontally oriented rectangular patch antenna shape configuration, a vertically oriented rectangular patch antenna shape configuration and a diagonally oriented patch shape configuration.

The at least two different antenna shape configurations may also or alternatively comprise at least two of a Babinet "V" shape antenna configuration, a rectangular patch shape antenna configuration, a slot antenna shape configuration, and a split-ring resonator antenna shape configuration.

The control circuit may be configured to modify the states of respective ones of the plurality of pixels of optically tunable material in the two or more tunable antennas such that each of the two or more antennas has a same antenna shape configuration but at different orientations relative to one another providing a reconfigurable geometric metasurface.

The plurality of pixels of optically tunable material of a given one of the tunable antennas may be arranged in a rectangular grid.

A given one of the plurality of pixels of optically tunable material in a given one of the tunable antennas may comprises chalcogenide PCM, and the control circuit may be configured to modify the state of the given pixel of the given tunable antenna by providing current from the first electrode coupled to the given pixel to the second electrode coupled to the given pixel to heat the chalcogenide PCM to change a phase of the chalcogenide PCM from one of crystalline and amorphous to the other one of crystalline and amorphous.

In some embodiments, a semiconductor structure comprises a substrate, a plurality of pixels of optically tunable material disposed over the substrate, a plurality of first electrodes coupled to respective ones of the plurality of pixels of optically tunable material and to a plurality of switches providing current sources, and a plurality of second electrodes coupled to respective ones of the plurality of pixels of optically tunable material and to a ground voltage. Current supplied between the first electrodes and the second electrodes is configured to modify states of the plurality of pixels of optically tunable material to adjust a reflectivity of the plurality of pixels of optically tunable material to dynamically reconfigure an antenna shape of a tunable antenna comprising the plurality of pixels of optically tunable material.

At least a given one of the plurality of pixels of optically tunable material may comprise a chalcogenide PCM, and current supplied between the first electrode and the second electrode coupled to the given pixel of optically tunable material may be configured to modify the state of the chalcogenide PCM via heating to change the chalcogenide PCM between an amorphous phase and a crystalline phase.

The chalcogenide PCM may comprise at least one of $Ge_xSb_yTe_z$, $Ge_xTe_y$, $Sb_xTe_y$, $Ag_xSb_yTe_z$, and $Ag_wIn_xSb_yTe_z$.

At least a given one of the plurality of pixels of optically tunable material may comprise an electrically tunable plasmonic material. The electrically tunable plasmonic material comprises at least one of graphene, carbon nanotubes, a metal oxide and a metal nitride.

At least a given one of the plurality of pixels of optically tunable material may comprise a metal-insulator transition material.

The semiconductor structure may further comprise a first dielectric layer disposed between the substrate and the plurality of pixels of optically tunable material, a second dielectric layer disposed over the plurality of pixels of optically tunable material, and a transparent conductor disposed over the second dielectric layer, wherein the plurality of first electrodes and the plurality of second electrodes are disposed over the transparent conductor at opposite ends of respective ones of the plurality of pixels of optically tunable material. The semiconductor structure may further comprise a metal mirror disposed between the substrate and the first dielectric layer.

The semiconductor structure may further comprise a first transparent conductor disposed between the substrate and the plurality of pixels of optically tunable material, a second transparent conductor disposed over the plurality of pixels of optically tunable material, a first insulator layer disposed over the substrate adjacent first ends of the plurality of pixels of optically tunable material, and a second insulator layer disposed over the substrate adjacent second ends of the plurality pixels of optically tunable material, wherein the plurality of first electrodes are disposed over the first insulator layer and the plurality of second electrodes are disposed between the substrate and the second insulator layer. The semiconductor structure may further comprise a metal mirror disposed between the substrate and the first insulator layer, the first transparent conductor and the second insulator layer, the metal mirror providing the plurality of second electrodes.

In some embodiments, a method comprises determining a desired interference effect for a reconfigurable metasurface comprising two or more tunable antennas, each of the two or more tunable antennas comprising a plurality of pixels of optically tunable material, the plurality of pixels of optically tunable material being coupled via respective ones of a plurality of first electrodes to respective ones of a plurality of switches providing current sources and via respective ones of a plurality of second electrodes to a ground voltage. The method also comprises utilizing a control circuit to adjust reflectivity of the plurality of pixels of optically tunable material by modifying states of the plurality of pixels of optically tunable material in each of the two or more tunable antennas to dynamically reconfigure respective antenna shape configurations of each of the two or more tunable antennas to provide the desired interference effect.

A given one of the plurality of pixels of optically tunable material in a given one of the two or more tunable antennas may comprise chalcogenide PCM, and utilizing the control circuit to modify the state of the given pixel may comprise providing current from the first electrode coupled to the given pixel to the second electrode coupled to the given pixel to heat the chalcogenide PCM to change a phase of the chalcogenide PCM from one of crystalline and amorphous to the other one of crystalline and amorphous.

It should be understood that the various layers, structures, and regions shown in the figures are schematic illustrations that are not drawn to scale. In addition, for ease of explanation, one or more layers, structures, and regions of a type commonly used to form semiconductor devices or structures may not be explicitly shown in a given figure. This does not imply that any layers, structures, and regions not explicitly shown are omitted from the actual semiconductor structures. Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be required to form a functional semiconductor integrated circuit device. Rather, certain processing steps that are commonly used in forming semiconductor devices, such as, for example, wet cleaning and annealing steps, are purposefully not described herein for economy of description.

Moreover, the same or similar reference numbers are used throughout the figures to denote the same or similar features, elements, or structures, and thus, a detailed explanation of the same or similar features, elements, or structures are not repeated for each of the figures. It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error is present, such as ±5%, preferably less than 2% or 1% or less than the stated amount.

In the description above, various materials and dimensions for different elements are provided. Unless otherwise noted, such materials are given by way of example only and embodiments are not limited solely to the specific examples given. Similarly, unless otherwise noted, all dimensions are given by way of example and embodiments are not limited solely to the specific dimensions or ranges given.

Semiconductor devices and methods for forming the same in accordance with the above-described techniques can be employed in various applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, functional circuitry, etc. Systems and hardware incorporating the semiconductor devices are contemplated embodiments of the invention. Given the teachings provided herein, one of ordinary skill in the art will be able to contemplate other implementations and applications of embodiments of the invention.

In some embodiments, the above-described techniques are used in connection with semiconductor devices that may require or otherwise utilize, for example, complementary metal-oxide-semiconductors (CMOS s), metal-oxide-semiconductor field-effect transistors (MOSFETs), and/or fin field-effect transistors (FinFETs). By way of non-limiting example, the semiconductor devices can include, but are not limited to CMOS, MOSFET, and FinFET devices, and/or semiconductor devices that use CMOS, MOSFET, and/or FinFET technology.

Various structures described above may be implemented in integrated circuits. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either: (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
    two or more tunable antennas providing a reconfigurable metasurface, each of the two or more tunable antennas comprising a plurality of pixels of optically tunable material; and
    a control circuit comprising a plurality of switches providing current sources and a ground voltage, the plurality of switches being coupled to respective ones of the plurality of pixels of optically tunable material in each of the two or more tunable antennas via one of a plurality of first electrodes, the ground voltage being coupled to respective ones of the plurality of pixels of optically tunable material in each of the two or more tunable antennas via one of a plurality of second electrodes;
    wherein the control circuit is configured to modify states of respective ones of the plurality of pixels of optically tunable material in the two or more tunable antennas utilizing current supplied between the first electrodes and the second electrodes to adjust reflectivity of the plurality of pixels of optically tunable material in each of the two or more tunable antennas to dynamically reconfigure respective antenna shape configurations of each of the two or more tunable antennas;
    wherein at least a given one of the plurality of pixels of optically tunable material in at least a given one of the tunable antennas comprises a phase change material; and
    wherein the control circuit is configured to modify the state of the given pixel of the given tunable antenna by providing current from the first electrode coupled to the given pixel to the second electrode coupled to the given pixel to change the phase change material from a first phase having a first set of optical properties to a second phase having a second set of optical properties different than the first set of optical properties.

2. The apparatus of claim 1, wherein the control circuit is configured to modify the states of respective ones of the plurality of pixels of optically tunable material in at least one of the two or more tunable antennas to dynamically reconfigure an antenna shape of said at least one of the two or more tunable antennas between at least two different antenna shape configurations.

3. The apparatus of claim 2, wherein the at least two different antenna shape configurations comprise two or more different orientations of a given antenna shape configuration.

4. The apparatus of claim 3, wherein the two or more different orientations of the given antenna shape configuration comprise at least two of a horizontally oriented rectangular patch antenna shape configuration, a vertically oriented rectangular patch antenna shape configuration and a diagonally oriented patch shape configuration.

5. The apparatus of claim 2, wherein the at least two different antenna shape configurations comprise at least two of a Babinet "V" shape antenna configuration, a rectangular patch shape antenna configuration, a slot antenna shape configuration, and a split-ring resonator antenna shape configuration.

6. The apparatus of claim 1, wherein the control circuit is configured to modify the states of respective ones of the plurality of pixels of optically tunable material in the two or more tunable antennas such that each of the two or more tunable antennas has a same antenna shape configuration but at different orientations relative to one another providing a reconfigurable geometric metasurface.

7. The apparatus of claim 1, wherein the plurality of pixels of optically tunable material of at least one of the two or more tunable antennas are arranged in a rectangular grid.

8. The apparatus of claim 1 wherein the phase change material comprises chalcogenide phase change material.

9. The apparatus of claim 8 wherein the chalcogenide phase-change material comprises at least one of germanium antinomy telluride, germanium telluride, antimony telluride and silver antimony telluride.

10. The apparatus of claim 1 wherein providing the current from the first electrode coupled to the given pixel to the second electrode coupled to the given pixel heats the phase change material to change the phase change material from the first phase having the first set of optical properties to the second phase having the second set of optical properties different than the first set of optical properties.

11. The apparatus of claim 1 wherein the first phase comprises a crystalline phase and the second phase comprises an amorphous phase, and wherein the control circuit is configured to modify the state of the given pixel to positively define an antenna shape of the given tunable antenna with portions of the phase change material in the amorphous phase.

12. The apparatus of claim 1 wherein the first phase comprises an amorphous phase and the second phase comprises a crystalline phase, and wherein the control circuit is configured to modify the state of the given pixel to positively define an antenna shape of the given tunable antenna with portions of the phase change material in the crystalline phase.

13. An apparatus comprising:
two or more tunable antennas providing a reconfigurable metasurface, each of the two or more tunable antennas comprising a plurality of pixels of optically tunable material; and
a control circuit comprising a plurality of switches providing current sources and a ground voltage, the plurality of switches being coupled to respective ones of the plurality of pixels of optically tunable material in each of the two or more tunable antennas via one of a plurality of first electrodes, the ground voltage being coupled to respective ones of the plurality of pixels of optically tunable material in each of the two or more tunable antennas via one of a plurality of second electrodes;
wherein the control circuit is configured to modify states of respective ones of the plurality of pixels of optically tunable material in the two or more tunable antennas utilizing current supplied between the first electrodes and the second electrodes to adjust reflectivity of the plurality of pixels of optically tunable material in each of the two or more tunable antennas to dynamically reconfigure respective antenna shape configurations of each of the two or more tunable antennas; and
wherein a given one of the plurality of pixels of optically tunable material in a given one of the tunable antennas comprises chalcogenide phase change material; and
wherein the control circuit is configured to modify the state of the given pixel of the given tunable antenna by providing current from the first electrode coupled to the given pixel to the second electrode coupled to the given pixel to heat the chalcogenide phase change material to change a phase of the chalcogenide phase change material from one of crystalline and amorphous to the other one of crystalline and amorphous.

14. The apparatus of claim 13, wherein the control circuit is configured to modify the states of respective ones of the plurality of pixels of optically tunable material in at least one of the two or more tunable antennas to dynamically reconfigure an antenna shape of said at least one of the two or more tunable antennas between at least two different antenna shape configurations.

15. The apparatus of claim 14, wherein the at least two different antenna shape configurations comprise two or more different orientations of a given antenna shape configuration.

16. The apparatus of claim 15, wherein the two or more different orientations of the given antenna shape configuration comprise at least two of a horizontally oriented rectangular patch antenna shape configuration, a vertically oriented rectangular patch antenna shape configuration and a diagonally oriented patch shape configuration.

17. The apparatus of claim 14, wherein the at least two different antenna shape configurations comprise at least two of a Babinet "V" shape antenna configuration, a rectangular patch shape antenna configuration, a slot antenna shape configuration, and a split-ring resonator antenna shape configuration.

18. The apparatus of claim 13, wherein the control circuit is configured to modify the states of respective ones of the plurality of pixels of optically tunable material in the two or more tunable antennas such that each of the two or more tunable antennas has a same antenna shape configuration but at different orientations relative to one another providing a reconfigurable geometric metasurface.

19. The apparatus of claim 13, wherein the plurality of pixels of optically tunable material of at least one of the two or more tunable antennas are arranged in a rectangular grid.

20. The apparatus of claim 13 wherein the chalcogenide phase-change material comprises at least one of germanium antinomy telluride, germanium telluride, antimony telluride and silver antimony telluride.

* * * * *